Oct. 17, 1967  J. O. BJERKE ET AL  3,347,051
BULKHEAD STRUCTURE AND METHOD OF MAKING THEREOF
Filed Oct. 16, 1964  5 Sheets-Sheet 3
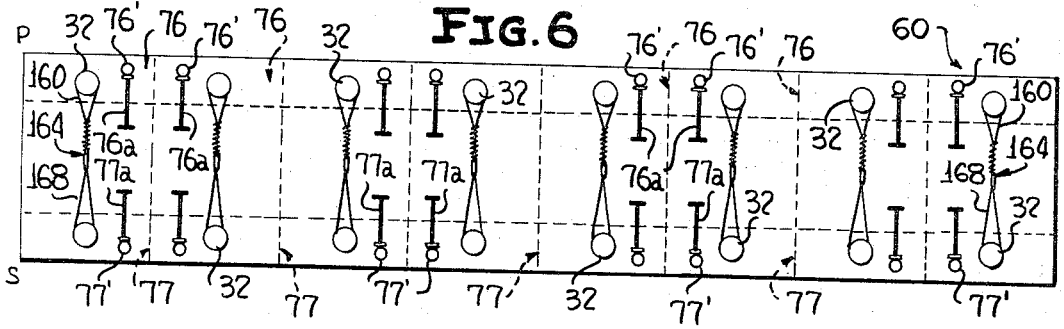
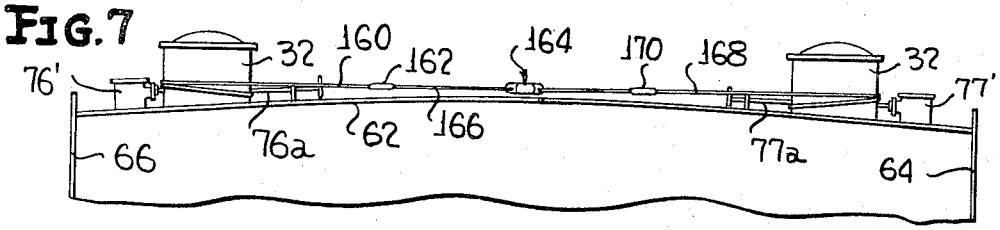
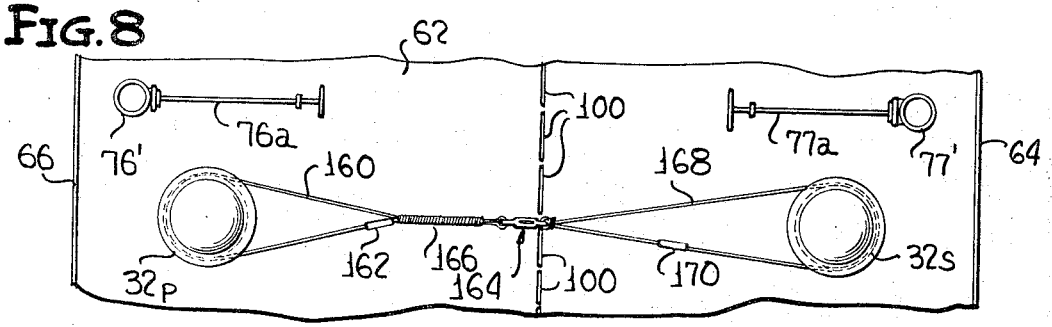
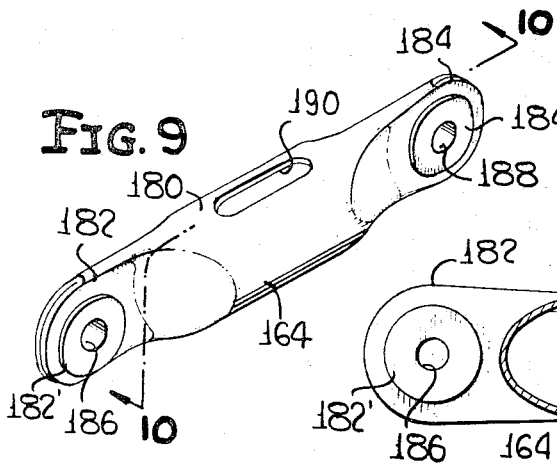
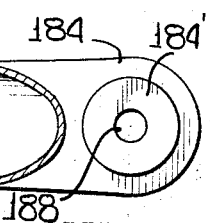
INVENTORS
JOHN O. BJERKE,
JOHN HALLIDAY,
JOHN L. STEVENS Jr.,
SAMUEL A. MAHLER & DONALD A. HOLDEN
BY
Shoemaker Ward Mattan
ATTORNEYS

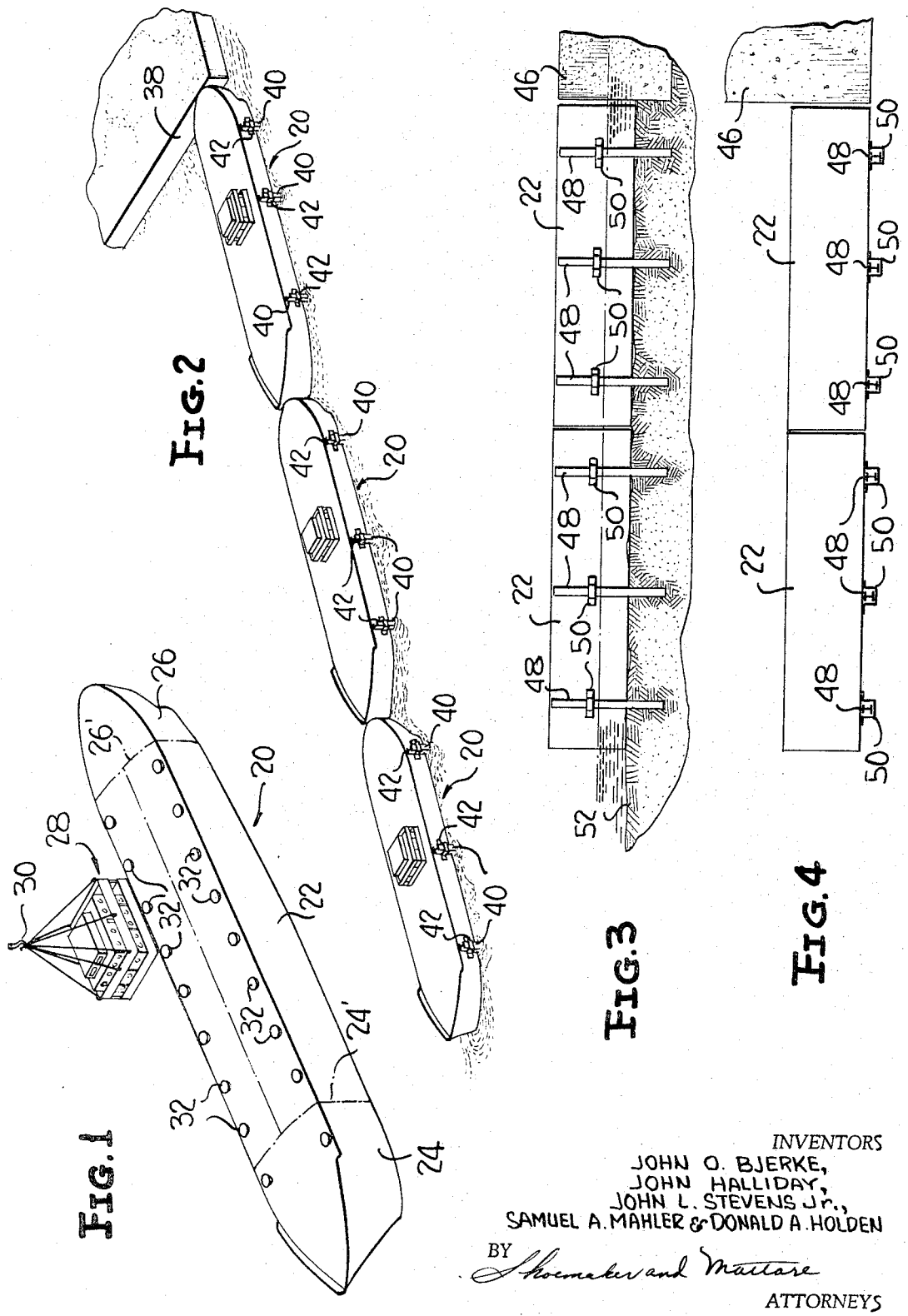

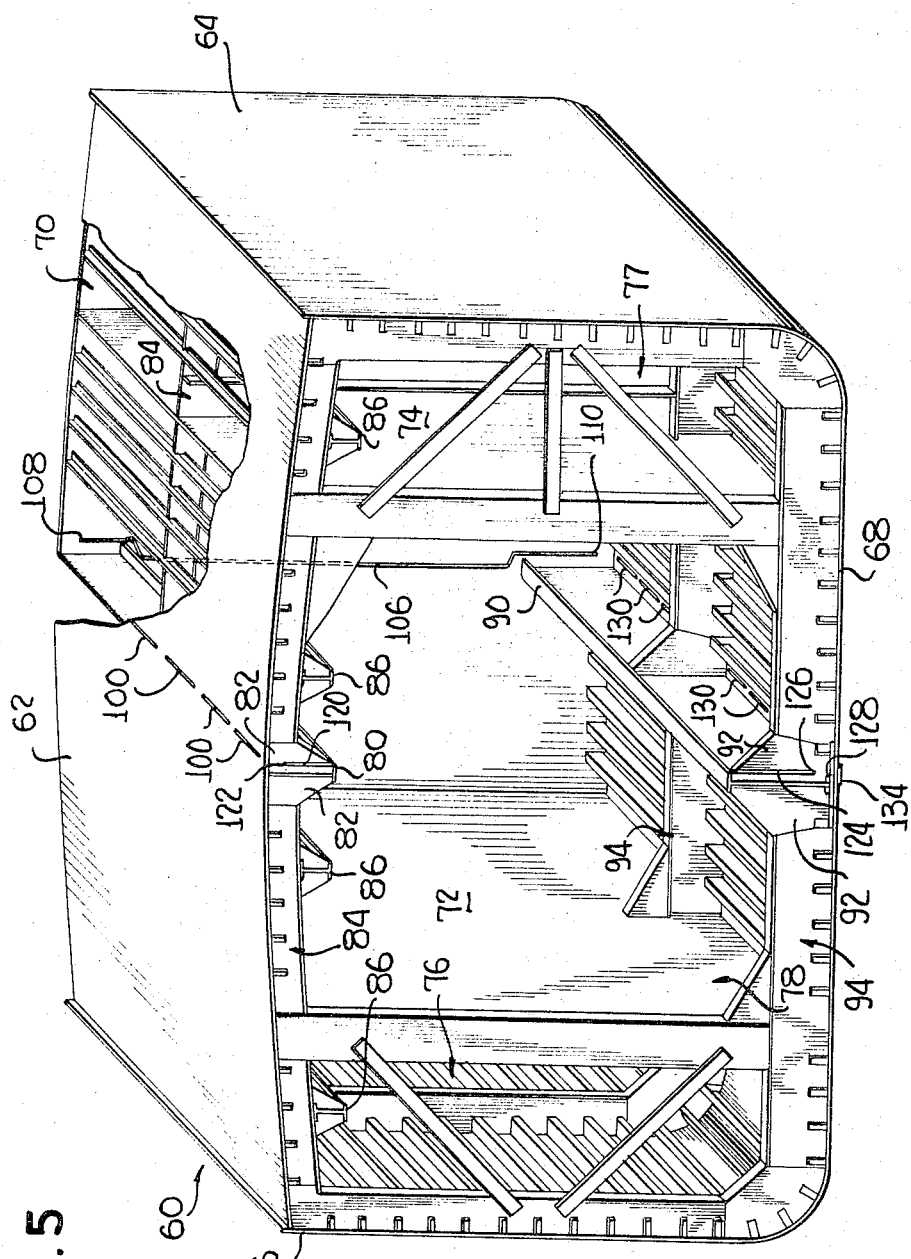

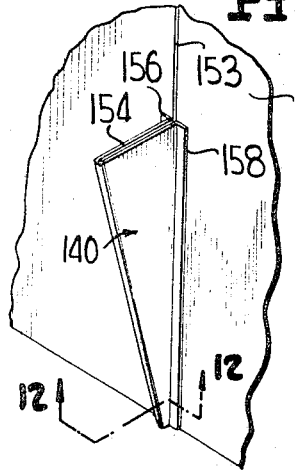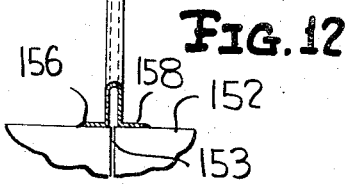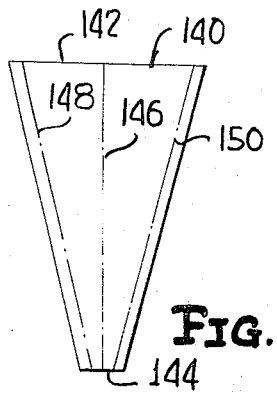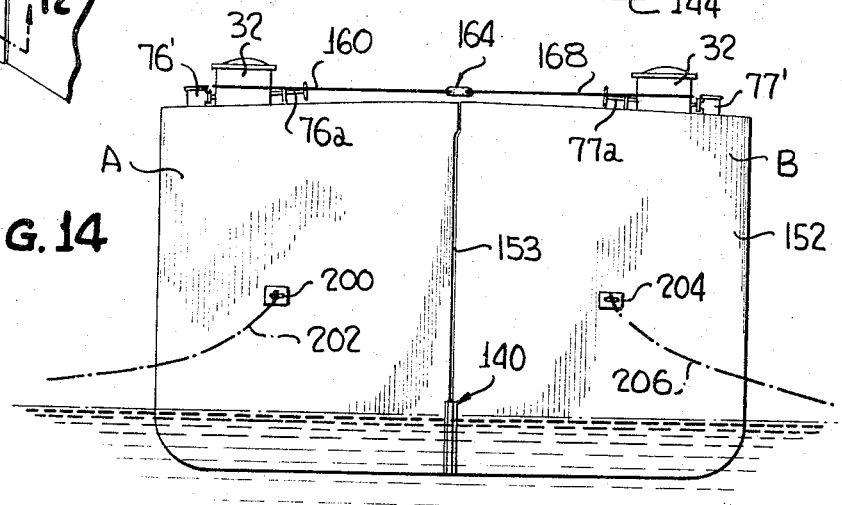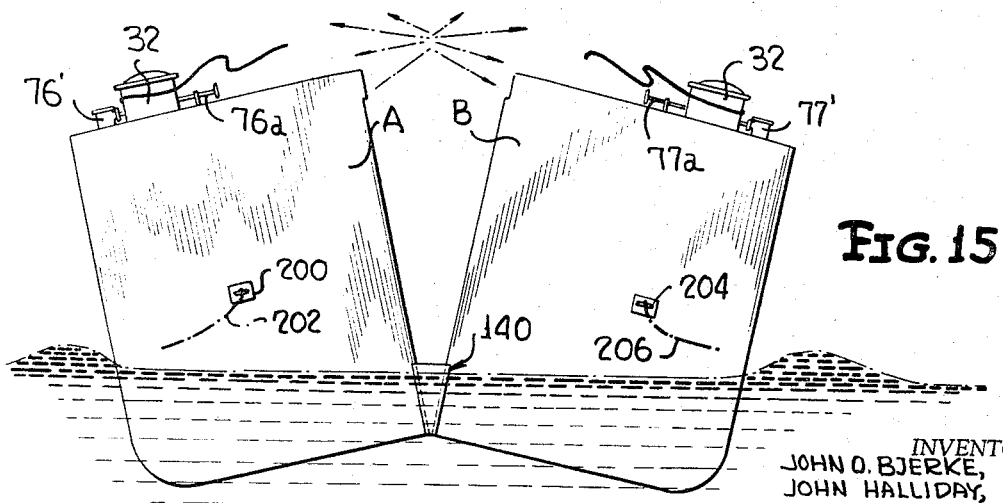

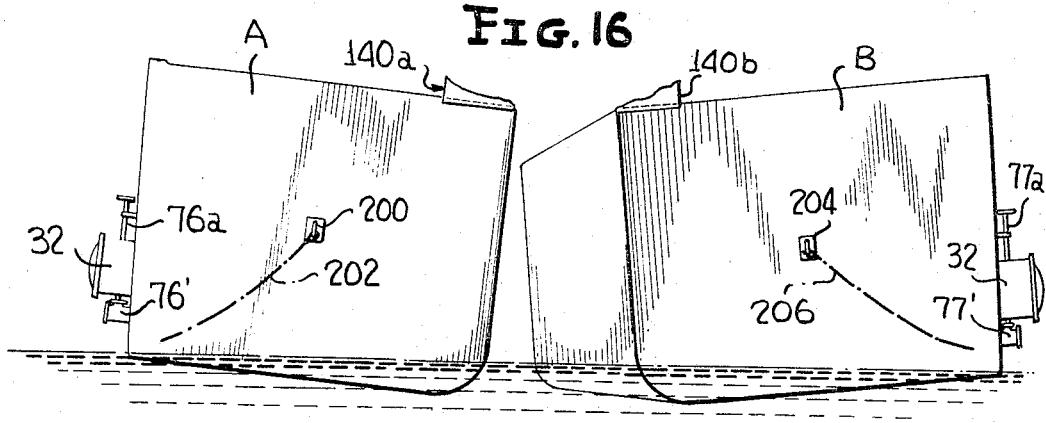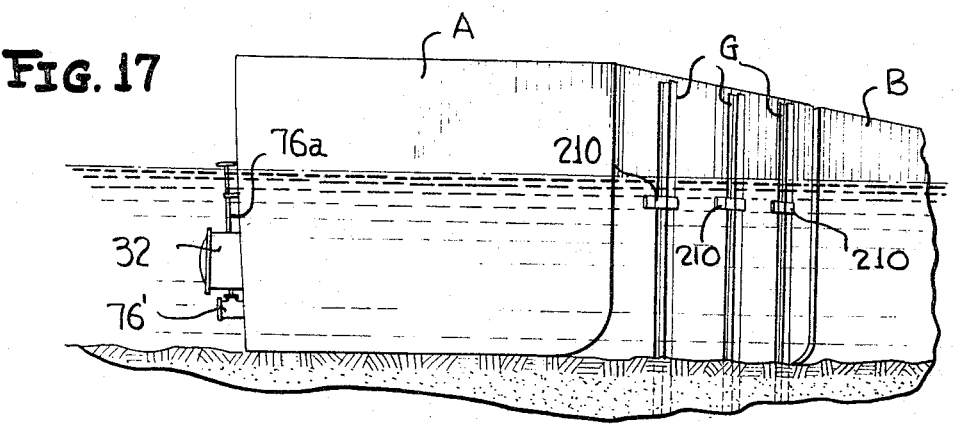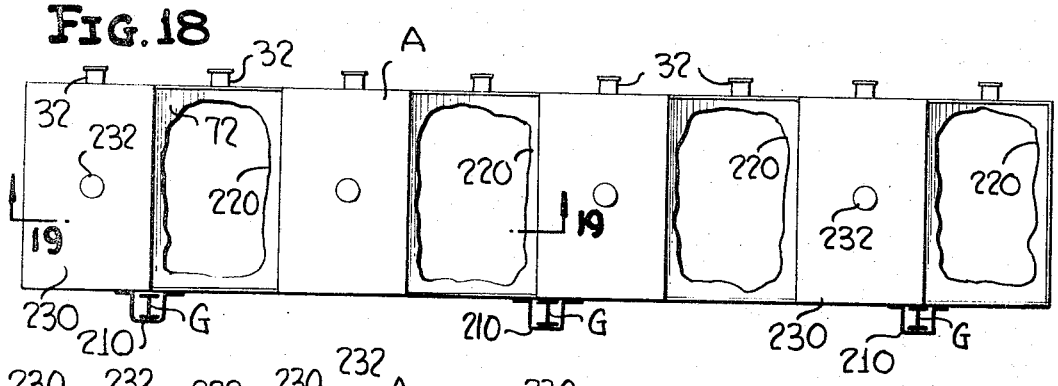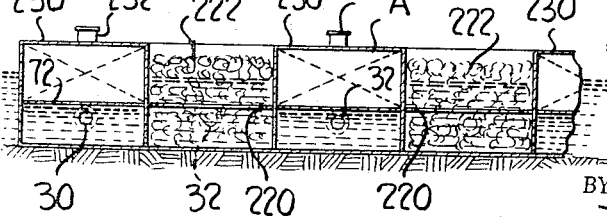

United States Patent Office 3,347,051
Patented Oct. 17, 1967

3,347,051
BULKHEAD STRUCTURE AND METHOD
OF MAKING THEREOF
John O. Bjerke, Newport News, John Halliday, Hampton, and John L. Stevens, Jr., Samuel A. Mahler, and Donald A. Holden, Newport News, Va., assignors to Newport News Shipbuilding and Dry Dock Company, Newport News, Va., a corporation of Virginia
Filed Oct. 16, 1964, Ser. No. 404,433
12 Claims. (Cl. 61—46)

The present invention relates to a new and novel bulkhead structure and method of making thereof, and more particularly to a bulkhead structure made from conventional ships for use along a waterfront and the like.

The present invention is directed to the type of bulkhead structure which is generally employed along waterfronts either as a breakwater or for reclaiming land and similar purposes. As described herein, the bulkhead structure may be employed for enlarging a waterfront facility wherein it is desired to have a very substantial bulkhead structure such that dirt can be filled into the space adjacent to the bulkhead structure to form a continuation of the waterfront to extend outwardly into the previously existing water.

It is of course apparent that the bulkhead structure according to the present invention must be of very substantial size and weight in order to accomplish the desired end results. The present invention is accordingly directed to an arrangement wherein the bulkhead structure is made of conventional ships which for one reason or another may be ready to be discarded and which can be put to use for this purpose.

In a first form of the invention, a plurality of ships are provided wherein substantially the entire ship may be sunk into operative relationship with the ships being disposed in substantially end to end relationship to one another. A particular feature of the present invention is the provision of guide means in the form of elongated I-beams or the like which are driven into the water bottom and which extend upwardly to the surface of the water. Certain parts of the ships are interconnected with these guide means so that when the ships are sunk they accurately move into the proper operative relationship and are further anchored and held in such relationship by the guide means. This is extremely important since it has proved quite difficult in the past to accurately sink the ships in the desired position.

In a further form of the invention, the bow and stern portions of a ship as well as the superstructure thereof may be removed so as to leave the mid-body portion of the ship. These mid-body portions then in turn may be placed in substantially end to end relationship and sunk into the operative position utilizing guide means in a manner similar to that previously discussed.

In a still further form of the invention and one which is considered to be the preferred embodiment, a ship of the bulk cargo type having no internal deck structures is provided and is split substantially longitudinally thereof so as to provide a pair of longitudinal halves which can then be placed in end to end relationship and sunk into operative position as discussed hereinbefore.

A further novel feature of the present invention lies in the provision of storage means in the sunken ship portions. In other words, the two longitudinally extending halves of the ship may each be provided with certain tanks thereof which serve as storage tanks. With this arrangement, the sunken halves of the ship serve not only as a bulkhead structure but also as a permanent storage facility which may be employed for storing fuel oil and the like or which may be utilized as a de-watering facility.

In the novel method of making bulkhead structures according to the present invention, the ship is first modified so as to remove the bow and stern portions as well as the superstructure wherefrom the mid-body thereof is cut longitudinally along the deck as well as along the bottom shell. These cuts are made at spaced intervals longitudinally of the ship. The transverse bulkheads as well as the transverses are also cut in a vertical direction so that the ship can then later be separated substantially along the center line thereof.

The ship is then provided with auxiliary means for holding the two halves of the ship together. This auxiliary means in the present invention takes the form of wire ropes which are placed around the wing tank cargo coamings at opposite sides of the ship. The wire rope is held together by means of an explosive sleeve. The ship is then towed into deep water and the explosive sleeves are destroyed so as to release the auxiliary means which hold the two halves of the ship together. The force of gravity will then cause the two halves of the ship to fall apart from one another separating the ship into two longitudinally extending halves.

The halves of the ship are then towed into place adjacent the guide means which have been driven into the water bottom and the halves of the ship interconnected with such guide means.

The two halves of the ship are then sunk in a particular manner so as to accurately position them on the bottom and hold them in the proper operative relationship.

This over-all arrangement provides a very economical manner of forming large bulkhead structures which also may serve the additional function of a storage facility.

The halves of the ship may of course merely be employed as a bulkhead structure, but by making certain minor modifications of the tanks thereof, the structures can readily be employed for the dual function discussed above.

An object of the present invention is to provide a new and novel bulkhead structure composed of a plurality of ships which are substantially unmodified.

Another object of the invention is to provide a bulkhead structure composed of a plurality of ship mid-bodies.

A further object of the invention is the provision of a bulkhead structure comprising a pair of longitudinal halves of a ship disposed in substantially end to end relationship with one another.

Still another object of the invention is to provide a bulkhead structure which also serves as a storage means or de-watering facility.

Yet another object of the invention is to provide a new and novel method of making bulkheads.

Another object of the invention is to provide a novel method of cutting and separating a ship of the bulk cargo type into longitudinally extending halves.

Still another object of the invention is the provision of a novel method of forming a bulkhead structure including a unique means for guiding portions of a ship into operative position on a water bottom and retaining such portions of the ship in operative relationship.

Still a further object of the invention is to provide a method of forming bulkhead structures including a novel method of sinking portions of a ship.

A still further object of the invention is to provide an economical arrangement for forming large bulkhead structures.

Other objects and many attendant advantages of the invention will become more apparent when considered in connection with the specification and accompanying drawings, wherein:

FIG. 1 is a top perspective view of a ship of the type employed in the present invention;

FIG. 2 is a top perspective view illustrating a plurality of ships disposed in end to end relationship and which have been sunk into operative position as shown;

FIG. 3 is a front elevation of the bulkhead structure including two mid-bodies disposed in substantially end to end relationship with one another;

FIG. 4 is a top view of the structure shown in FIG. 3;

FIG. 5 is an enlarged perspective view in section illustrating a cross section of a portion of the mid-body of a ship utilized in the present invention and illustrating the manner in which certain cuts are made therein;

FIG. 6 is a top view of the deck of the mid-body of the ship as employed in the present invention illustrating the auxiliary wire rope means for holding the halves of the ship together;

FIG. 7 is a vertical section through the deck portion of a ship showing the manner in which the wire rope is looped around the pairs of wing tank cargo coamings;

FIG. 8 is a top view of the structure shown in FIG. 7;

FIG. 9 is a top perspective view of the explosive sleeve employed for holding the wire rope in place;

FIG. 10 is a sectional view taken substantially along line 10—10 of FIG. 9 looking in the direction of the arrows;

FIG. 11 is a top perspective view illustrating a folded plate which is welded about the bottom portion of the cut of each end bulkhead;

FIG. 12 is a sectional view taken substantially along line 12—12 of FIG. 11 looking in the direction of the arrows;

FIG. 13 is a plan view of the folded plate shown in FIG. 11 in its flat position prior to being folded;

FIG. 14 is an end view of the mid-body of the ship as it is being towed into position for separation;

FIG. 15 is a view showing the two halves of the ship as they separate from one another after the auxiliary holding means has been released;

FIG. 16 illustrates the manner in which the two halves of the ship are adapted to float in the water after having been separated;

FIG. 17 shows one half of the ship disposed in operative relationship on the water bottom and interconnected with the guide means;

FIG. 18 is a top view illustrating one half of the ship in its operative position and showing the manner in which the various tanks thereof may be modified; and FIG. 19 is a sectional view taken substantially along line 19—19 of FIG. 18 looking in the direction of the arrows.

Referring now to the drawings wherein like reference characters designate corresponding parts throughout the several views, FIG. 1 illustrates a ship adapted for use in the present invention, and this ship is preferably of the bulk cargo vessel type utilized for carrying coal, ore, grain, fuel oil and the like wherein no internal deck structure is present. This ship is indicated generally by reference numeral 20 and includes a central or mid-body portion 22 having a bow portion 24 disposed at one end thereof and a stern portion 26 disposed at the other end thereof. The bow and stern portions are adapted to be cut off along the phantom lines 24' and 26' respectively when it is desired to remove the bow and stern portions as hereinafter described.

The ship is provided with a superstructure generally indicated by reference numeral 28, and as seen in FIG. 1, the superstructure is illustrated as being lifted away from the deck of the ship by a suitable lifting hook indicated by reference numeral 30. The deck of the ship is provided with a plurality of wing tank cargo coamings indicated by reference numerals 32, a first row of such coamings being disposed along the port side of the deck and a second row of similar coamings being disposed along the starboard side of the deck.

Referring now to FIG. 2, a typical waterfront installation is indicated by reference numeral 38, and this may comprise any suitable sea wall, land mass, or the like against which it is adapted to provide a bulkhead structure extending out into the adjacent water.

As shown in FIG. 2, a plurality of ships 20 which may be substantially identical with the ship 20 illustrated in FIG. 1 are provided, the ships being three in number and being disposed in substantially end to end relationship with one another such that the bow portion of one ship is disposed closely adjacent the stern portion of the next ship.

A plurality of elongated piles are indicated by reference numerals 40, each of these piles preferably comprising a sturdy I-beam or the like which is adapted to guide sinking movement of the ships and to anchor them in operative position. As shown, three piles are provided for each ship, the ship being interconnected with the piles by means of metallic loops or straps 42 which are welded to the side shell portions of the ships, these straps being adapted to fit about the I-beams and to allow sliding movement between the piles or guide means and the ships.

In order to provide the bulkhead structure shown in FIG. 2, the piles 40 are driven into the water bottom and the ships are each in turn moved against the three piles associated therewith. The straps 42 are then suitably secured in place as by welding or the like, and the ship is then sunk as by opening suitable flooding valves whereby the ship will move downwardly until it rests on the sea bottom, the straps 42 constraining the ship for proper movement in such direction. In addition, it is apparent that the straps will serve to permanently anchor the ships to the guide means after the ships are resting on the bottom.

As illustrated in FIG. 2, the ships have been flooded and are resting on the water bottom. In order to ensure that the ships remain in such operative position, suitable ballast means may be provided therewithin such as scrap metal, aggregate and other waste materials which may be quite heavy and suitable for use as a weight for holding the ships in place.

Referring now to FIGS. 3 and 4, a further modified form of the invention is illustrated, wherein a ship such as shown in FIG. 1 is employed and the bow and stern portions 24 and 26 are removed from the ship as well as the superstructure 28 so as to leave the mid-body portion 22.

As seen in FIGS. 3 and 4, a plurality of mid-body portions 22 are disposed in substantially end to end relationship with one another and extend outwardly from a suitable shore installation indicated by reference numeral 46. The mid-body portions 22 are provided with straps or loops 50 suitably secured as by welding to the side shell portions thereof, these straps fitting about suitable guide means 48 such as I-beam girders which have been driven down into the water bottom as indicated in FIG. 3, the bottom being indicated by reference numeral 52.

Referring now particularly to FIG. 5 of the drawings, a cross section is illustrated through a portion of the mid-body 60 of a bulk cargo type vessel. The vessel includes a deck portion 62, a pair of side shell portions 64 and 66, and a bottom shell portion 68. A conventional transverse bulkhead 70 extends between the side shell portions and vertically from the deck to the bottom shell portion. A pair of longitudinal bulkheads 72 and 74 are provided, these longitudinal bulkheads dividing the space within the ship into a pair of wing tanks 76 and 77 and a central mid tank 78, these tanks being bounded at opposite ends by spaced transverse bulkheads such as bulkhead 70.

A center deck girder 80 extends longitudinally of the ship and is positioned immediately below the deck portion 62, and face plates 82 are interconnected with this girder to reinforce the structure. Transverses indicated generally by reference numerals 84 extend between the opposite side shell portions and the center deck girder immediately beneath the deck portion 62, these transverses being provided at spaced intervals between adjacent transverse bulkheads.

A plurality of longitudinally extending I-beam deck girders 86 extend longitudinally of the ship and are connected with the transverses as well as the transverse bulkheads, these I-beam deck girders being employed as the piles or guide means as hereinafter explained.

A center vertical keel 90 extends longitudinally of the ship, and face plates 92 are connected with this keel to reinforce the structure. Spaced transversers 94 extend between the opposite shell portions and along the bottom shell portion at spaced intervals between adjacent transverse bulkheads.

In carrying out the method of the present invention, the ship as shown in FIG. 1 may first have the superstructure 28 removed therefrom and the bow portion and the stern portion including the pump room and the machinery room are cut away and separated from the mid-body portion 22.

As seen in FIG. 5, the mid-body portion is indicated generally by reference numeral 60, and this figure illustrates the manner in which cuts are made in this mid-body portion. Since it is desirable to minimize the amount of time in which the ship may be in dry dock, certain cuts may be made in the mid-body prior to placing the mid-body in a dry dock.

Firstly, any walkway, piping, winches and so forth along the center line of the ship on deck should be removed as well as any piping, brackets, operating rods and the like on the center line of any transverse bulkhead.

While the ship is still afloat and prior to being placed in dry dock, a series of spaced cuts 140 are made in the deck portion of the mid-body. This may be done by burning a series of 3 inch diameter holes in the deck with such holes spaced at least 36 inches forward and aft of all transverse bulkheads and centered approximately 2 inches to starboard of the center line of the ship. A double cut is then made between the holes in order to locate clips and the like under the deck. The length of the uncut deck portion adjacent each bulkhead prevents premature opening of the hull. If desired, it is apparent that a continuous cut may be made between adjacent bulkheads leaving the 36 inch uncut portion at each side of the bulkheads as discussed above.

Each transverse bulkhead is then cut or burned except the end bulkheads along a line such as to produce the cut indicated by reference numeral 106 in FIG. 5, the cut being made from a point 108 spaced about 12 inches below the deck portion to a point 110 spaced about 12 inches above the bottom shell portion, the main part of the cut 106 being made along a line about 2 inches to starboard of the center line of the ship. The cut or burn is also made around the center line vertical keel face plate as necessary.

A cut 120 is then made in the center deck girder face plate 82, this cut being indicated by reference numeral 120 and terminating at a point 122 spaced about 12 inches below the deck portion 62. A similar cut 124 is made in the center line vertical keel face plate 92 to a point 126 spaced about 12 inches above the corner snipe 128.

The mid-body is then placed in a dry dock in order to complete the cutting and burning operation.

After placing the mid-body in a dry dock, the deck is then cut completely longitudinally thereof throughout the length of the mid-body. It will of course be understood that the mid-body will be held in place while the final cuts are being made in the dry dock due to the blocking of the hull. In a typical example, the blocking may be set in rows centered 7 feet, 6 inches and 25 feet from the center line of the hull. Keel track blocks may be used at a spacing of 7 feet, 6 inches from the center line of the hull with the hull placed 7 feet, 6 inches off the center line of the dock.

The transverse bulkheads are then cut to complete the cut 106 in each of these transverse bulkheads from the deck to the keel of the ship. The end bulkheads are also cut all the way from the deck to the keel in a vertical direction in a manner similar to the cut of each of the other transverse bulkheads.

The cuts are then completed in each of the center deck girder face plates 82 so as to cut these face plates all the way to the deck portion.

The bottom shell portion 68 is then cut so as to provide a plurality of spaced cuts 130 which may be also made about 2 inches to starboard of the center line of the ship, each of these cuts being about 3 feet long and spaced from one another by 1 inch of unburned or uncut shell, an unburned or uncut portion of 1 inch in length being provided forward and aft of each bulkhead and transverse with three 1 inch unburned places being provided in each bay.

After having made these cuts in the bottom shell, flat bars 134 which in a typical example may be a ¼ inch x 2 inch flat bar are welded over the cuts with continuous fillet welds. The condition of the hull will determine whether these flat bars are welded inside or outside of the bottom shell. As illustrated, the bars 134 are illustrated as being welded on the outside of the shell to close off the openings provided by the cut portions 130.

The entire hull is then examined for unwanted pipe openings, open valves or other sea water leaks. All such openings are closed up and patched. All cargo covers and bolt covers are closed on all Butterworth holes.

Referring now to FIG. 6, the mid-body 60 is illustrated and a series of port wing tanks 76 extend along one side of the ship and a series of starboard wing tanks 77 extend along the opposite side of the ship.

Used gate valves 76′ and 77′ are then installed through the top deck into each of the wing tanks 76 and 77 respectively. Each of these valves includes an operating arm, the arms being indicated by reference numerals 76a and 77a respectively, these arms extending in a direction toward the center line of the ship such that when the two halves of the ship are later separated, these operating handles will be accessible from the surface so that the valves can be open for flooding the hull section for sinking at the site. When installed, the gate valves are tested to make sure that they are free working so as to be readily operated at a later stage of the procedure.

Referring now particularly to FIG. 13 of the drawings, a plate 140 is illustrated, this plate being of trapezoidal configuration wherein a pair of parallel sides 142 and 144 are provided, side 142 being of substantially greater length than side 144. Three bend lines are indicated in FIG. 13, these bend lines including a central bend line 146 and a pair of side bend lines 148 and 150.

FIGS. 11 and 12 illustrate the plate in its installed position. This particular plate is installed in overlying relationship to the lower 8 feet or so of the cut provided in each end bulkhead. As seen in FIG. 11, an end bulkhead is indicated by reference numeral 152 and is provided with a vertically extending cut 153 extending from the deck to the keel.

The plate 140 is folded along the center fold line 146 so as to provide a main generally U-shaped body portion 154. A pair of flanges 156 and 158 are formed on the main body portion by bending along lines 148 and 150. These flanges are in turn welded to the outer surface of the associated end bulkhead.

It will be understood that a plate 140 is mounted at each end of the mid-body over the lower portion of the end bulkheads and is sealed at the lower portion thereof with respect to the bulkhead. This plate allows the ship to separate some distance before water floods the center line compartments.

Referring now particularly to FIGS. 7 and 8 of the drawings, the manner of holding the two halves of the ship together after all of the cuts have been made is illustrated. As seen in these figures, the port and starboard wing tank cargo coamings are indicated by reference numerals 32p and 32s respectively. A pair of wire ropes 160 and 168 are provided, each of these wire ropes may comprise 1⅛ inch wire rope double strand. Rope 160 is wrapped around coaming 32p one and one-half times and the opposite ends of the rope are permanently attached to one another by means of a clip means 162 of conventional construction. Rope 160 extends through a suitable opening provided in one end of an explosive sleeve 164 described in more detail hereinafter. The ropes are pulled tight and frapping as indicated at 166 is provided around rope 160.

The second wire rope 168 is also looped around its associated coaming 32s one and one-half times and the opposite ends of rope 168 are attached to one another by clip means 170. Rope 168 passes through attaching portions provided at the opposite end of the explosive link 164. It is apparent in the assembled position as seen in FIGS. 7 and 8, that the wire ropes will hold the two halves of the ship together until the explosive sleeves are destroyed so as to eliminate this interconnection between the opposite sides of the ship.

The construction of the explosive sleeve can be understood from an inspection of FIGS. 9 and 10. As seen in these figures, explosive sleeve 164 includes a generally tubular main body portion 180 which is flattened out at its opposite end portions 182 and 184. A pair of reinforcing disc-like plates 182' are secured to opposite sides of flattened end portion 182, and similar disc-like reinforcing plates 184' are secured to the opposite flattened end portion 184. A first hole 186 is formed through portions 182 and 182', and a second hole 188 is formed through portions 184 and 184', these holes being adapted to receive the aforementioned wire ropes.

The main tubular body portion 180 is provided with a longitudinally extending slot 190 in one side thereof, this slot being adapted to receive a suitable explosive substance which may be inserted into the interior of the explosive sleeve for detonation at a desired time. It is apparent that when an explosive disposed within the sleeve is detonated, the sleeve will be destroyed releasing the interconnection between the coamings at opposite sides of the ship.

After the auxiliary interconnection is provided as shown in FIGS. 7 and 8 between the opposite coamings, a suitable explosive substance is inserted in the sleeves 164, it being understood that a plurality of such interconnections are provided as shown in FIG. 6 wherein eight different interconnections are illustrated between the coamings at opposite sides of the ship. Each of the explosive sleeves is then primed with electric primer caps and suitable electrical leads are connected with the primer caps, these electrical leads being carried to one end of the mid-body section and being adapted to be picked up later on by a tug boat operator.

As seen in FIG. 14, a pair of towing fittings 200 and 204 are welded to the opposite halves of the mid-body, these two halves being indicated by the letters A and B. Towing lines 202 and 206 are illustrated as being connected with the towing fittings 200 and 204 respectively.

As seen in FIG. 14, the mid-body is then removed from the dry dock and towed by means of the tow lines in a tug boat or the like to a channel of at least 20 foot water depth whereupon both halves are anchored in position.

The electrical leads connected with the electric primer caps are then connected with a detonating switch and when the tug boat and personnel are safely clear of the area, the charges in the explosive sleeves are fired so as to destroy the sleeves and to permit the two halves A and B of the ship to separate from one another and fall apart due to the force of gravity. It will be recognized that once the cable connection between the coamings at the port and starboard sides of the ship have been severed, the weight of the ship will cause the remaining intact portions of the ship to be torn away due to the size and weight of the halves of the ship.

FIG. 15 illustrates the initial stage of separation of the two halves A and B after the explosive sleeves have been destroyed. As seen in this figure, the plate 140 is spreading apart and initially prevents flooding of the center line compartments. These plates of course will readily deform under the force applied thereto.

Turning now to FIG. 16, the position of the two halves of the ship A and B is illustrated after the halves are completely separated from one another. As seen in this figure, the plates 140 have been torn into sections 140a and 140b, and the two halves of the ship have rolled over into a position such that the original side shell portions thereof face in a downward direction.

The two halves of the ship are then towed back to pier side and the I-beam girders 86 are removed from the mid-body. In a typical example, these sections of I-beam girders may have a length of approximately 40 feet and may be connected together to provide an over-all guide means or a pile of approximately 80 feet in length which then is driven into the water bottom to serve as a guide and anchor means for the halves of the ship as previously explained.

Before sinking the halves of the ship into operative position, the area where the sections are to be sunk should be dredged and in a typical example a dredging may be to a depth of 15 feet below low water. Referring to FIG. 17, the sections A and B are illustrated in substantially end to end relationship with one another with the section A shown in its final operative position. As seen in this figure, three spaced guide means G are provided, these guide means being formed of the I-beam girders as discussed previously, and being driven into the water bottom at approximately 100 foot intervals.

The section A is moved up against guide means G, and straps 210 are welded to the bottom shell portion of the section so as to guide movement of the section into place as it is sunk by opening the valves into the tanks as described previously. A selective flooding procedure is employed for placing one end of each section on the bottom before the rest of the section is flooded.

In sinking each half of the ship, the bow portion of the mid-body should be sunk to the bottom first since due to its shape it will dig into the bottom less the stern portion thereof. In order to explain the method of sinking the ship, it is assumed that each half of the mid-body is divided into the eight holds which are numbered 1 through 8 consecutively from the bow portion of the mid-body to the stern portion thereof. The valves to the number 1 and number 2 holds are first opened and the bow portion will lower. The valve to the number 3 hold is then opened and this will cause the bow to contact the water bottom.

The valves to the number 5 and number 7 holds are then opened and the mid-body will still have positive stability and because of the shape of the bow portion thereof quite a length of the ship will be on the bottom. The valves to the number 4 hold, the number 6 hold and the number 8 hold are then opened and the ship will lose stability but the stern portion should bottom without developing list because of the support of the bottom at the bow portion of the mid-body and also because the guide means will tend to cause the mid-body half to sink in the proper manner.

Referring now to FIGS. 18 and 19, the section A is shown in its operative position on the water bottom. The longitudinal bulkhead portion 72 may be cut away as indicated at 220 in alternate holds so as to provide access to the wing tanks so that the portion of the mid-tank and the adjacent wing tank in these alternate holds of this half of the ship may be filled with a suitable aggregate or weight means such as pieces of concrete or the like, this aggregate fill being indicated by reference numeral 222 in FIG. 19.

As seen particularly in FIG. 19, the wing tanks lying beneath the longitudinal bulkhead portion 72 in those holds not having the aggregate therein may contain a liquid or the like which may be stored therewithin. Any suitable means may be provided for gaining access to these wing tanks. In addition, top plate means 230 may be placed over alternate tops of the mid-tank portions so as to form storage means between such top plate 230 and the longitudinal bulkheads of alternate holds, access opening means 232 being provided in these top plates 230 so that any suitable means may be stored within the storage tanks as provided.

It is apparent from the foregoing that there is provided according to the present invention a new and novel bulkhead structure and method of making thereof wherein the bulkhead structure can be made from conventional ships. The bulkhead structure may comprise a plurality of entire ships disposed in substantially end to end relationship to one another, or a plurality of mid-bodies of ships may be disposed in end to end relationship. In the preferred embodiment of the invention, the mid-body of a bulk cargo type vessel is split longitudinally thereof to provide longitudinally extending halves of the mid-body which are disposed in substantially end to end relationship. This bulkhead structure according to the present invention also serves as a storage means in that certain tank portions thereof may be employed for storing suitable substances therewithin.

A new and novel method of making bulkheads is provided including the novel steps of cutting and separating the mid-body of a ship into separate halves and then providing guide means for guiding the separated halves into operative position and for retaining them in place. The method also contemplates a novel procedure for sinking the halves of the mid-body into the desired operative relationship. The method according to the present invention provides a very economical arrangement for making large bulkheads as employed along waterfronts and the like.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. The method of making a bulkhead structure comprising providing a plurality of ships, removing the bow portion and the stern portion from each of said ships to leave the mid-body of each of said ships having relatively flat ends, providing guide means extending down into the bottom of a body of water, interconnecting each of said mid-bodies with said guide means by attaching strap means to only one side portion of each of said mid-bodies with the strap means fitting loosely about said guide means to allow sliding movement between the guide means and the ships, and then sinking each of said mid-bodies to the water bottom with the mid-bodies being disposed with said flat ends in substantially end to end relationship with one another and being interconnected with said guide means so as to retain the mid-bodies in proper operative relationship.

2. The method of making a bulkhead structure comprising providing a ship, removing the bow and stern portions of the ship as well as the superstructure thereof, separating the ship into two halves extending longitudinally of the ship, disposing said halves of the ship in substantially end to end relationship with one another, providing guide means extending down into a water bottom, interconnecting said halves of the ship with said guide means, sinking said halves of the ship until they rest on the water bottom with the halves of the ship interconnected with the guide means for holding the halves of the ship in operative position.

3. The method of making a bulkhead structure comprising providing a ship, removing the bow and the stern portions of the ship as well as the superstructure thereof, cutting the ship substantially in half longitudinally thereof to provide two longitudinally extending halves, sealing each half of the ship so as to be substantially watertight, separating said halves so that the halves each float in the water in such a position that the original side shell portions thereof are disposed downwardly, providing guide means extending down into a water bottom, interconnecting portions of each of said halves of the ship with said guide means, then sinking said halves until the original side shell portions rest upon the water bottom with the halves attached to said guide means for holding the halves in operative relationship.

4. The method as defined in claim 3 including the additional step of providing open spaces in each of said halves of the ship and filling such spaces with weight means for holding the halves of the ship in permanent position on the water bottom.

5. The method of making a bulkhead structure comprising providing a ship, removing the bow and stern portions of the ship as well as the superstructure thereof, cutting certain portions of the ship so as to allow the ship to separate longitudinally thereof into two longitudinally extending halves, sealing each half of the ship so as to be substantially watertight, separating the ship into halves in a body of water so that the two halves fall away from one another to float in a position such that the original side shell portions thereof are directed in a downward direction, then forming storage tank means in each of said halves and forming open spaces in each of said halves, providing guide means extending down into a water bottom, moving said halves of the ship into closely adjacent relationship to said guide means, interconnecting said halves with said guide means, sinking said halves so as to move downwardly along said guide means until the side shell portions of said halves rest upon the water bottom, then filling said open spaces with aggregate to hold the halves in operative position, and finally filling said storage tank means so as to provide permanent storage facilities for any desired material.

6. The method of making a bulkhead structure comprising providing a bulk cargo type ship, cutting certain portions of the ship along lines extending longitudinally of the ship as well as vertically thereof so as to permit separation of the ship into two substantial halves along the longitudinal axis thereof, said cuts being spaced at intervals along portions of the ship so as to retain a certain degree of structural strength and integrity, providing means for sinking each half of the ship after it is divided, providing auxiliary means for holding the two halves of the ship together and to prevent premature separation thereof, moving the ship into a body of water, releasing said auxiliary holding means to permit the weight of the ship to separate the two halves of the ship into floating position such that the two halves are each disposed with the original side shell portions thereof facing downwardly, providing guide means extending down into the bottom of a body of water, moving the two floating halves of the ship to a position closely adjacent said guide means, interconnecting each half of the ship with said guide means, then sinking each of said halves of the ship in substantially end to end relationship with one another until the side shell portions of the halves are resting on the water bottom with the halves of the ship interconnected with said guide means for retaining the halves in proper operative position.

7. The method as defined in claim 6 wherein spaced cuts are initially made in the deck of the ship extending longitudinally of the ship and substantially along the center line thereof, and cuts are also made vertically through the transverse bulkheads of the ship substantially along the center line thereof to a point spaced slightly below the deck and slightly above the bottom shell, cuts also being made partly through the transverses of the ship closely adjacent to the center line thereof.

8. The method as defined in claim 6 including the additional steps of completing the cutting of the deck longitudinally of the ship, cutting the top portion of each of the transverse bulkheads, making a plurality of spaced cuts in the bottom shell extending longitudinally of the ship substantially along the center line thereof, and welding connecting means over these last-mentioned cuts to temporarily hold the bottom shell intact.

9. The method as defined in claim 8 including the additional steps of welding a folded plate over the bottom portion of the cut on each end bulkhead of the mid-body of the ship to permit the ship to separate some distance before water floods the center line compartments.

10. The method as defined in claim 6 wherein the step of providing auxiliary means for holding the two halves of the ship together comprises connecting wire rope around port and starboard pairs of wing tank cargo coamings, connecting such wire ropes with an explosive sleeve means, and then later exploding and destroying said sleeve means to release this auxiliary connection and permitting the halves of the ship to separate from one another under the influence of gravity.

11. The method as defined in claim 6 including placing tops on certain tanks of each separated half of the ship and providing access opening in such tanks for storage therewithin, cutting holes in the longitudinal bulkheads of other tanks, and later filling such holes with aggregate to hold the tanks in place.

12. A bulkhead structure comprising a plurality of portions of a ship, each of said portions comprising a longitudinally extending vertical half of the mid-body of a bulk cargo ship having wing tanks at opposite sides thereof, said mid-bodies having relatively flat ends disposed in substantially end-to-end relationship with one another and closely adjacent one another, each of said ship portions including a bottom shell, a side shell and a deck, said ship portions resting on said side shells on the water bottom, and means for guiding the ship portions into operative relationship and for retaining said ship portions in such relationship, said guide means comprising separate elongated rigid pile members extending into the bottom of a body of water, and strap members secured to the bottom shell of a ship portion and fitting loosely about said pile members, to allow sliding movement between said pile members and said ship portions.

References Cited

UNITED STATES PATENTS

| | | | |
|---|---|---|---|
| 1,870,154 | 8/1932 | Wehr | 61—4 |
| 2,014,116 | 9/1935 | Powers | 61—4 |
| 2,385,601 | 9/1945 | Bartholomew | 61—4 |
| 2,652,693 | 9/1953 | Goldman et al. | 61—46.5 |
| 3,075,252 | 1/1963 | King | 52—29 |

FOREIGN PATENTS

| | | |
|---|---|---|
| 1,225 | 11/1863 | Great Britain. |
| 1,238 | 4/1869 | Great Britain. |
| 600,129 | 4/1948 | Great Britain. |

JACOB SHAPIRO, *Primary Examiner.*